(12) United States Patent
Staudt

(10) Patent No.: US 8,496,265 B2
(45) Date of Patent: Jul. 30, 2013

(54) ASSEMBLY AND AIRBAG MODULE

(75) Inventor: Holger Staudt, Grossostheim (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 13/377,635

(22) PCT Filed: Jun. 23, 2010

(86) PCT No.: PCT/EP2010/003763
§ 371 (c)(1),
(2), (4) Date: Feb. 8, 2012

(87) PCT Pub. No.: WO2010/149347
PCT Pub. Date: Dec. 29, 2010

(65) Prior Publication Data
US 2012/0139212 A1    Jun. 7, 2012

(30) Foreign Application Priority Data
Jun. 26, 2009    (DE) .......................... 10 2009 030 601

(51) Int. Cl.
*B60R 21/16*    (2006.01)
(52) U.S. Cl.
USPC ............ 280/731; 280/740; 280/741; 280/742
(58) Field of Classification Search
USPC .................. 280/731, 740, 741, 742
See application file for complete search history.

(56) References Cited

U.S. PATENT DOCUMENTS

| | | | | |
|---|---|---|---|---|
| 6,565,113 | B2* | 5/2003 | Kassman et al. | 280/728.2 |
| 6,702,318 | B2* | 3/2004 | Rose et al. | 280/728.2 |
| 6,709,004 | B1* | 3/2004 | Judd et al. | 280/728.2 |
| 6,941,836 | B2* | 9/2005 | Umemura et al. | 74/552 |
| 7,255,364 | B2* | 8/2007 | Bonam et al. | 280/731 |
| 7,722,075 | B2* | 5/2010 | Amamori | 280/728.2 |
| 2002/0140210 | A1 | 10/2002 | Lovell et al. | |
| 2003/0214119 | A1 | 11/2003 | Grossmann et al. | |

FOREIGN PATENT DOCUMENTS

| | | |
|---|---|---|
| DE | 20105434 | 6/2002 |
| DE | 20210372 | 10/2002 |
| DE | 10215330 | 4/2003 |
| DE | 102007054056 | 5/2009 |
| EP | 1452404 | 9/2004 |

* cited by examiner

*Primary Examiner* — Toan To
(74) *Attorney, Agent, or Firm* — Tarolli, Sundheim, Covell & Tummino LLP

(57) ABSTRACT

An airbag module, especially for a vehicle occupant restraint system, includes an assembly of an inflator (16) having a mounting flange (32) and an inflator supporting member (18) for resilient support of the inflator (16). The inflator supporting member (18) includes a holding member (24) made of metal sheet and at least one mounting foot (26) arranged at the holding member (24) for connection to an inflator base (12). The holding member (24) and the mounting flange (32) are fixed to each other by plastic shaping of at least one of the two members.

15 Claims, 2 Drawing Sheets

ASSEMBLY AND AIRBAG MODULE

RELATED APPLICATIONS

This application corresponds to PCT/EP2010/003763, filed Jun. 23, 2010, which claims the benefit of German Application No. 10 2009 030 601.3, filed Jun. 26, 2009, the subject matter, of which is incorporated herein by reference in their entirety.

BACKGROUND OF THE INVENTION

The invention relates to an assembly comprising an inflator having a mounting flange and an inflator supporting member for resilient support of the inflator, especially for a vehicle occupant restraint system.

In the case of airbag modules disposed in the steering wheel vehicle movements inducing vibrations of the steering wheel can result in undesired effects. This applies in particular when a floating horn module, as it is called, is used in which the entire airbag module including the relatively heavy inflator is movably mounted for actuating the horn. There are approaches to solution in which the mass of the inflator is decoupled from the residual airbag module by means of an interconnected elastic element. Such decoupling is complicated, especially because the space in the steering wheel is very restricted. Consequently, there is a need of a simple, inexpensive and space-saving vibration decoupling of the inflator.

SUMMARY OF THE INVENTION

According to the invention this object is achieved by an assembly, especially for a vehicle occupant restraint system, comprising an inflator having a mounting flange and an inflator supporting member for resilient support of the inflator in which the inflator supporting member includes a holding member of metal sheet and at least one mounting foot made of elastic material and arranged at the holding member for connection to an inflator base, wherein the holding member and the mounting flange are fixed to each other by plastic reforming of at least one of the two members.

The invention permits making use of a wide-spread conventional type of inflator so that the inflator need not be especially adjusted to the inflator supporting member, as this is frequently the case with conventional supports for vibration decoupling. Instead, according to the invention the holding member is preferably plastically reformed so as to permanently fix the inflator supporting member to the flange of the inflator. As an alternative, also the mounting flange can be reformed or else both parts can be reformed completely or partially. The mounting of the inflator on the inflator base as well as the decoupling of the inflator with respect to vibrations is completely effectuated through one or more mounting feet made of elastic material. They prevent a direct transmission of vibrations from the inflator base to the inflator.

Optionally the inflator can also act as vibration absorber.

The holding member preferably has an annular shape so that it is adapted to surround the mounting flange.

The holding member can be locked at the mounting flange by crimping, stamping or bordering, wherein both the holding member and the mounting flange can be deformed. As a matter of course, also any other suited method of plastic reforming can be employed.

In order to obtain stable mounting the holding member is preferably mounted circumferentially at the inflator. It is also possible, however, to provide a mounting only in portions.

According to a preferred embodiment of the invention, the inflator supporting member has at least one stop lip of elastic material substantially extending in an axial direction of the assembly. The stop lip abuts against the inflator base in a vertical movement, i.e. in a movement in the axial direction, and limits the travel path of the inflator in this direction. Advantageously in a normal state of the assembly, when the latter is mounted in an airbag module, a distance is provided between the stop lip and the inflator base.

In order to ensure safe and simple limitation of even heavy movements of the inflator an extension of the holding member projecting in axial direction can be provided in the area of the stop lip so as to increase the stability of the stop lip by the metal sheet of the holding member.

Preferably the extension is embedded in the stop lip, wherein the axially free end of the stop lip is advantageously formed only of the elastic material.

The extension can be realized, for instance, by at least one latch projecting from the holding member. In this way simple manufacture of the holding member, for instance as a stamped and bent member, is possible.

The stop lip is preferably continuously formed to be closed at least largely circumferentially, wherein of advantage it is circumferentially closed as far as permitted by the geometry of the inflator supporting member and the mounting feet.

Silicone is preferably employed as elastic material and the mounting foot is preferably extrusion-molded to the holding member.

The stop lip is also preferably extrusion-molded to the holding member. In this way, a stable connection of the members made of the elastic material to the metal sheet of the holding member is possible while exhibiting very flexible geometry and simple manufacture.

Furthermore, the invention relates to an airbag module including an afore-described assembly, wherein plural mounting feet are provided for mounting the inflator on the inflator base. The mounting feet serve as the only mounting between the assembly and the inflator base.

Prior to mounting on the inflator base each mounting foot can have a mounting latch that forms the free end of the mounting foot. At this mounting latch the mounting foot can be pulled through an opening in the inflator base, for instance, at which it is locked. The mounting latch is removed after mounting the assembly, but it can also remain at the mounting foot.

Each of the mounting feet advantageously has a circumferential groove into which an edge of the opening in the inflator base engages so that the mounting foot locks in the opening and is thus secured to the opening.

In a preferred manner, the stop lip is opposed to an axial and/or a radial stop at the inflator base which limits a movement of the inflator in the axial direction and/or radial direction. By forming the stop in the axial and/or radial direction a motion play of the inflator can be individually predetermined. The stop in axial direction can be simply formed by a surface portion of the inflator base.

Upon activation of the inflator the stop lip preferably enters into contact with the inflator base and effectuates a sealing between the inflator and the inflator base. Due to the pulse of the exiting gas and the internal pressure of the airbag, the inflator is forced in the axial direction toward the inflator base so that the stop lip contacts the inflator base. In this way it is achieved that the filling gas for an airbag provided by the inflator cannot escape through the gap between the inflator and the inflator base. It is advantageous in this case when the stop lip is formed to be largely completely circumferential. It has turned out, however, that small gaps in the stop lip have no negative effect.

BRIEF DESCRIPTION OF THE DRAWINGS

Further features and advantages of the invention are resulting from the following description of an embodiment with reference to the enclosed drawings, in which.

DESCRIPTION OF EXAMPLE EMBODIMENT

Figure 1:
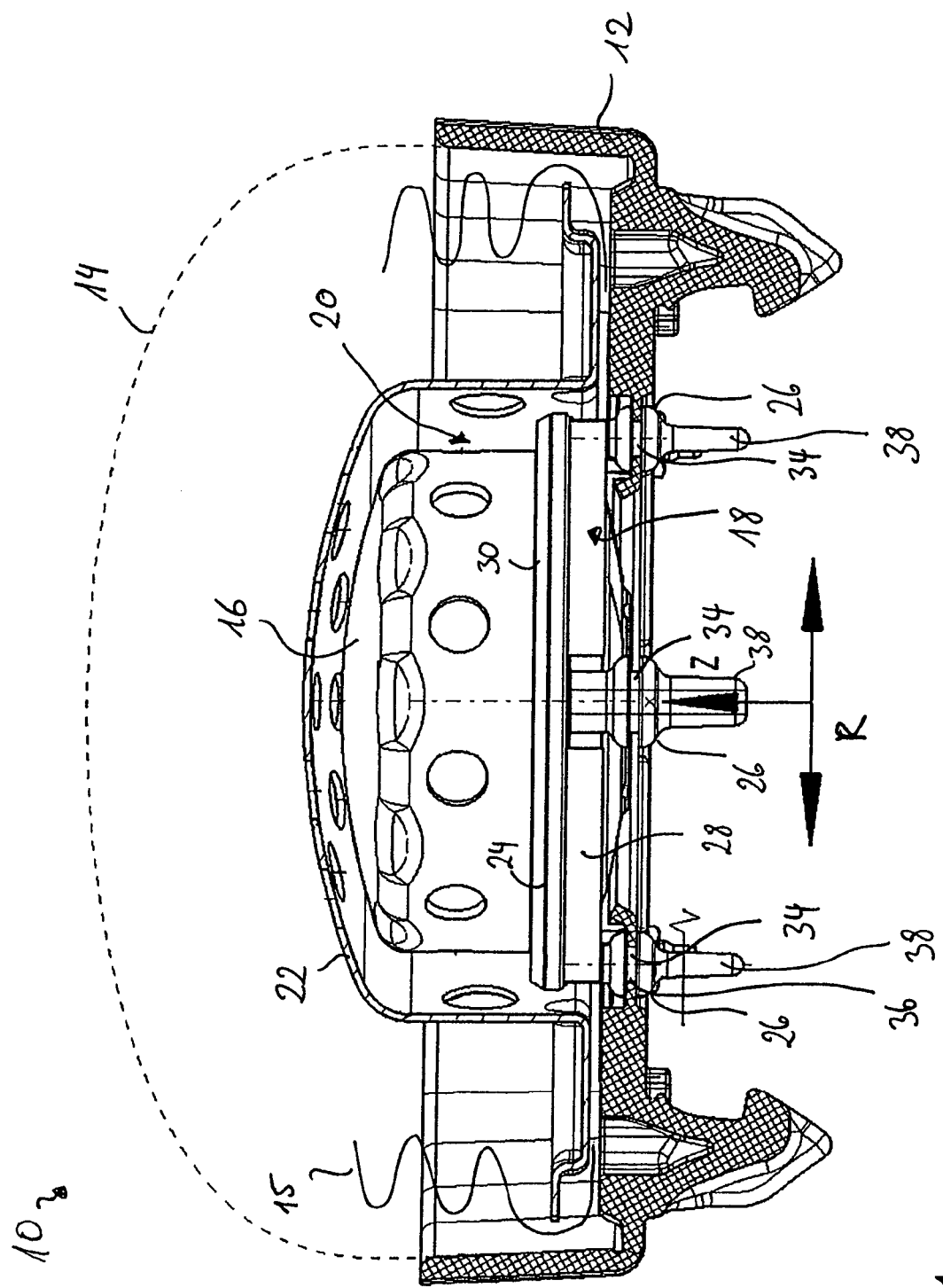
FIG. 1 shows a partly sectional view of an airbag module according to the invention comprising an assembly according to the invention.

FIG. 1 shows an airbag module 10 intended for use in a steering wheel of a passenger car. An airbag 15 is accommodated in a folded state in a module casing of an inflator base 12 and an only indicated cover cap 14. The filling gas for the airbag 15 is provided by an inflator 16 pot-shaped in this case.

The inflator 16 is resiliently supported on the inflator base 12 via an inflator supporting member 18 and forms a prefabricated assembly 20 together with the inflator supporting member 18. A cap-shaped diffuser 22 is arranged between the inflator 16 and the airbag 15 at a distance from the inflator 16. In this way a certain restricted motion play is given for the inflator 16 in all spatial directions.

The inflator base member 18 consists of a holding member 24 made of metal sheet as well as of plural mounting feet 26 and a stop lip 28 made of elastic material. In this example silicone is used as elastic material. The mounting feet 26 and the stop lip 28 are extrusion-molded to the holding member 24.

The holding member 24 is designed in the form of a circumferential ring having an L-shaped cross-section with a pulled-up outer edge 30. For fixing the inflator supporting member 18 and the inflator 16 to each other the inflator 16 is inserted in the holding member 24 so that a radially projecting mounting flange 32 formed integrally with the inflator 16 and surrounding the latter in circumferential direction is arranged inside the outer edge 30 of the holding member 24 and is supported on the holding member 24.

Then the outer edge 30 is mechanically shaped so as to obtain a fixed connection to the mounting flange 32. Shaping can be performed, for instance, by crimping, stamping or bordering but also by any other appropriate shaping. It would also be possible in this case to completely or partly deform the mounting flange 32 instead of the holding member 24. By this measure the inflator supporting member 18 is tightly connected to the inflator 16 so that the assembly 20 can be prefabricated and handled as a separate unit.

In this example, four mounting feet 26 extend perpendicularly to the plane predetermined by the holding member 24 in the axial direction referred to as Z direction in FIG. 1. Each of the mounting feet 26 completely consists of elastic material and includes an integrally formed circumferential groove 34. An edge of an opening 36 in the inflator base 12 engages in said groove 34 so that each mounting foot 26 is tightly mounted on the inflator base 12.

Each of the mounting feet 26 includes a mounting latch 38 initially forming the free end of the mounting foot 26 as a mounting aid. For mounting the assembly 20 on the inflator base 12 the mounting latches 38 are put through the openings 36 and then moved, by pulling the mounting latches 38, in the axial direction Z toward the inflator base 12 until the groove 34 engages each of the mounting feet 26 in the respective edge of the opening 36. Now the mounting latches 38 can be removed, if desired. They do not contribute to the further function of the assembly.

The stop lip 28 comprises plural circle segments of silicone arranged along the periphery of the holding member 24. At the four positions where the mounting feet 26 are extrusion-molded to the holding member 24 the stop lip 28 is interrupted for reasons of manufacture so that small gaps are present between the stop lip 28 and the mounting feet 26. As an alternative, the stop lip 28 could also be integrally transformed into the respective mounting foot 26 and could thus be integrally circumferentially closed.

Figure 2:
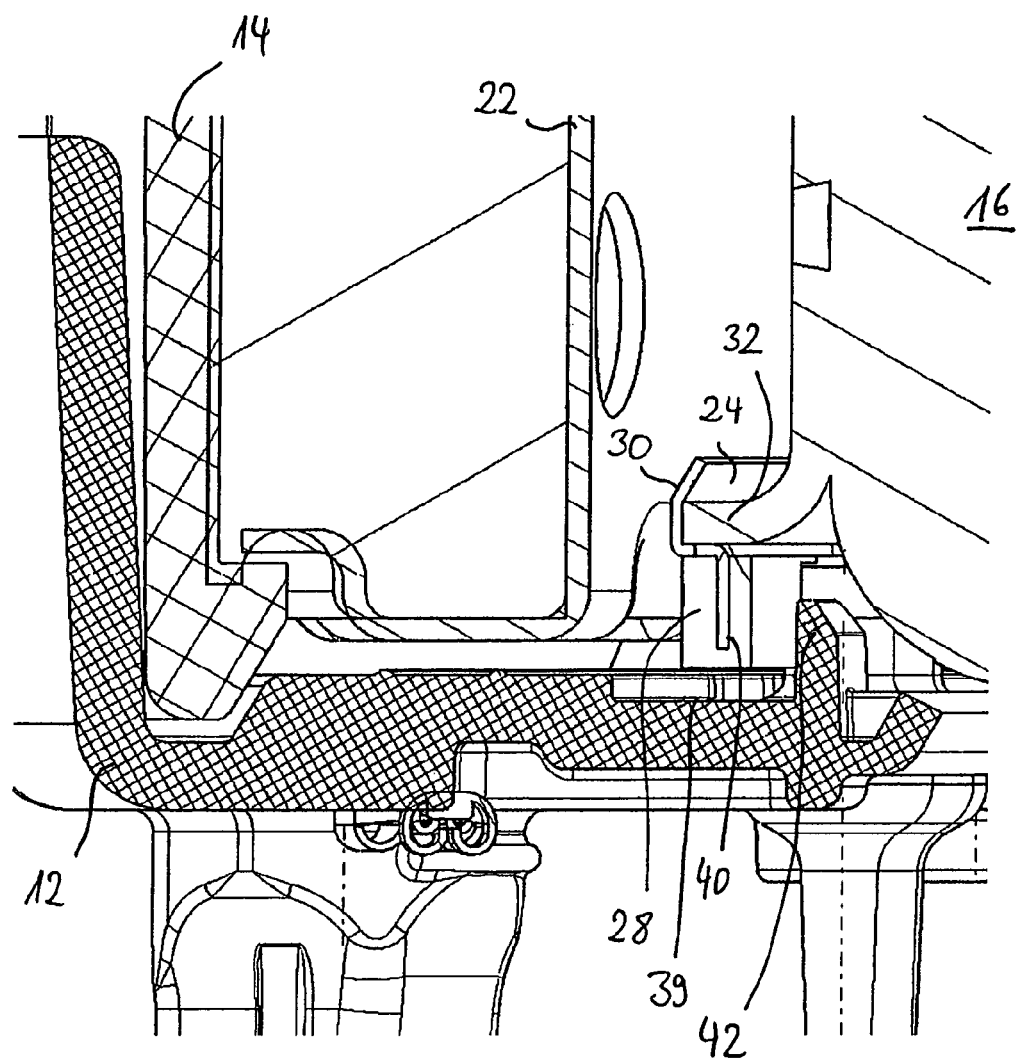
FIG. 2 shows a cut-out of the airbag module of FIG. 1 in a sectional view.

The inflator supporting member 18 is configured so that in the normal state, i.e. without a movement of the inflator 16 and prior to activating the latter, a small space is formed in the axial direction Z between the lower end in axial direction of the stop lip 28 and a surface of the inflator base 12. If the inflator 16 moves in the axial direction Z, upon a higher amplitude the stop lip 28 enters into contact with the inflator base 12, thereby limiting the movement of the inflator 16. The surface of the inflator base 12 serves as an axial stop 39 (cf. FIG. 2).

In order to ensure sufficient resistance especially with heavy movements of the inflator 16, along the circumference plural axially projecting extensions 40 of the holding member 24 are embedded in the stop lip 28 in the form of bent latches. The extensions 40 end ahead of the free axial end of the stop lip 28 so that the elastic material always contacts the inflator base 12.

A limitation of the movement of the inflator 16 in the radial direction R is ensured by a stop 42 formed at the inflator base 12 and provided radially inward of the stop lip 28. The stop 42 can consist of a circumferential ring or else of individual projections spaced over the periphery of the inflator base 12.

The stop 42 extends in the axial direction Z toward the inflator 16 so far that an overlapping with the extension 40 is provided. In the normal state the stop lip 28 is spaced apart both from the axial stop 39 and from the radial stop 42. In this case, the stop 42 is formed integrally with the inflator base 12.

In normal driving operation the elastic material of the mounting feet 26 ensures decoupling of the inflator 16 from the vibrations of the steering wheel in which the airbag module 10 is inserted. The inflator 16 is allowed to freely move within the play between the stop lip 28 and the stops 39 and 40. A larger movement is prevented by said stops 39, 40.

It is possible to adjust the frequency of the system of vibration of the inflator 16 and the mounting feet 26 so as to damp or completely absorb the mainly occurring interference frequencies. This is not necessary, however, there can also be provided a mere vibration decoupling.

Upon activation of the inflator 16 so that filling gas exits from the latter into the airbag, the pressure of the exiting gas as well as the increasing filling pressure in the airbag induces a movement of the inflator 16 toward the inflator base 12, wherein the stop lip 28 enters into full-surface largely circumferential contact with the inflator base 12. In this way a sealing is obtained preventing gas from exiting from the airbag 15 through the inflator base 12. The gaps provided in the periphery of the stop lip 28 here for constructional reasons have not turned out to be interfering.

It would also be imaginable to provide plural separate holding members distributed along the periphery of the inflator 16 and each having one or more mounting feet.

Instead of silicone also any other suitable elastic material such as rubber or an elastomer can be employed.

The invention claimed is:

1. An assembly, especially for a vehicle occupant restraint system, comprising an inflator (16) having a mounting flange (32) and an inflator supporting member (18) for resilient support of the inflator (16),
wherein the inflator supporting member (18) includes a holding member (24) of metal sheet and at least one mounting foot (26) made of elastic material and arranged at the holding member (24) for connection to an inflator base (12) and wherein the holding member (24) and the mounting flange (32) are fixed to each other by plastic shaping of at least one of the holding member and the mounting flange.

2. The assembly according to claim 1, wherein the holding member (24) has an annular shape.

3. The assembly according to claim 1, wherein the holding member (24) is locked at the mounting flange (32) by crimping, stamping or bordering.

4. The assembly according to claim 3, wherein the holding member (24) is circumferentially mounted on the inflator (16).

5. The assembly according to claim 1, wherein the inflator supporting member (18) has at least one stop lip (28) made of the elastic material and extending substantially in an axial direction (Z) of the assembly (20).

6. The assembly according to claim 5, wherein at least one extension (40) of the holding member (24) projecting in the axial direction (Z) is provided in the area of the stop lip (28).

7. The assembly according to claim 6, wherein the extension (40) is embedded in the stop lip (28).

8. The assembly according to claim 6, wherein the extension (40) is formed by at least one latch projecting from the holding member (24).

9. The assembly according to claim 6, wherein the stop lip (28) is continuously formed to be at least largely circumferentially closed.

10. The assembly according to claim 1, wherein the elastic material is silicone and the mounting foot (26) is preferably excursion-molded to the holding member (24).

11. An airbag module comprising an assembly according to claim 1 and an inflator base (12), wherein plural mounting feet (26) are provided and the mounting feet (26) mount the inflator (16) on the inflator base (12).

12. the airbag module according to claim 11, wherein prior to mounting on the inflator base (12) each of the mounting feet (26) has a mounting latch (38) which forms the free end of the associated mounting foot (26).

13. The airbag module according to claim 11, wherein each mounting foot (26) includes a circumferential groove (34) in which an edge of an opening (36) in the inflator base (12) engages.

14. The airbag module according to claim 11, wherein the stop lip (28) is opposed to an axial and/or a radial stop (42) provided at the inflator base (12) for limiting a movement of the inflator (16) in the axial direction (Z) and/or the radial direction (R).

15. The airbag module according to claim 11, wherein upon activation of the inflator (16) the stop lip (28) contacts the inflator base (12) and effectuates a sealing between the inflator (16) and the inflator base (12).

* * * * *